US010110766B2

(12) United States Patent
Inui

(10) Patent No.: US 10,110,766 B2
(45) Date of Patent: Oct. 23, 2018

(54) METHOD OF CONTROLLING A PRINTING APPARATUS THAT SCRAMBLES IDENTIFICATION INFORMATION OF AN AUTHENTICATED USER AND CAUSES A PRINTER TO PRINT CHARACTERS OBTAINED BY SCRAMBLING THE IDENTIFICATION INFORMATION, AND RELATED PRINTING METHOD, AND NON-TRANSITORY COMPUTER READABLE MEDIUM

(71) Applicant: CANON KABUSHIKI KAISHA, Tokyo (JP)

(72) Inventor: Masanobu Inui, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/638,662

(22) Filed: Mar. 4, 2015

(65) Prior Publication Data

US 2015/0261477 A1    Sep. 17, 2015

(30) Foreign Application Priority Data

Mar. 14, 2014  (JP) ................................ 2014-052434

(51) Int. Cl.
*G06F 3/12* (2006.01)
*H04N 1/00* (2006.01)
*H04N 1/32* (2006.01)

(52) U.S. Cl.
CPC ....... *H04N 1/00925* (2013.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS 5,798,844 A * 8/1998 Sakano .................... G03C 5/08
358/401
8,701,206 B2    4/2014 Yamada
(Continued)

FOREIGN PATENT DOCUMENTS

CN    101135957 A    3/2008
CN    102739896 A    10/2012
(Continued)

OTHER PUBLICATIONS

European Search Report dated Sep. 1, 2015 issued in corresponding European Patent Application No. 15158990.0.
(Continued)

*Primary Examiner* — Christopher D Wait
(74) *Attorney, Agent, or Firm* — Fitzpatrick, Cella, Harper & Scinto

(57) ABSTRACT

A method of controlling an image forming apparatus having a scanner that scans a document to obtain an image of the document as the image and a printer that prints an image on a sheet. The method includes performing an authentication processing for authenticating a user that uses the image forming apparatus, causing the scanner to scan a document in accordance with a copy instruction by the authenticated user, obtaining a month, day, and time on which the image obtained by scanning the document with the scanner is printed by the printer, scrambling identification information of the authenticated user using at least one of the obtained month, day, and time, and causing the printer to print, on a sheet, (i) the image obtained by scanning the document with the scanner, (ii) one or more characters obtained by scrambling the identification information, and (iii) the obtained month, day, and time.

11 Claims, 19 Drawing Sheets

(52) U.S. Cl.
CPC .......... *G06F 3/1258* (2013.01); *G06F 3/1285* (2013.01); *H04N 1/00482* (2013.01); *H04N 1/32133* (2013.01); *H04N 1/32144* (2013.01); *H04N 2201/0094* (2013.01)

(56) References Cited

U.S. PATENT DOCUMENTS

| | | |
|---|---|---|
| 8,976,382 B2 | 3/2015 | Kakutani |
| 8,988,724 B2 | 3/2015 | Inui |
| 2005/0147252 A1* | 7/2005 | Dasari .................. H04L 9/08 380/277 |
| 2007/0206838 A1* | 9/2007 | Fouquet ................ G06F 21/32 382/115 |
| 2008/0055633 A1 | 3/2008 | Kajiyama et al. |
| 2008/0205959 A1* | 8/2008 | Miyashita ............ G06F 17/211 400/76 |
| 2009/0129591 A1 | 5/2009 | Hayes et al. |
| 2010/0123908 A1* | 5/2010 | Denoue ................ G06F 17/212 358/1.6 |
| 2010/0202020 A1* | 8/2010 | Kato .................... G06F 21/608 358/1.15 |
| 2011/0188073 A1* | 8/2011 | Akutsu ................. G06F 15/00 358/1.15 |
| 2012/0250086 A1 | 10/2012 | Imayoshi |
| 2014/0376026 A1 | 12/2014 | Inui et al. |

FOREIGN PATENT DOCUMENTS

| | | |
|---|---|---|
| JP | 09-6235 A | 1/1997 |
| JP | 10-243244 A | 9/1998 |
| JP | 2000-148740 A | 5/2000 |
| JP | 2003-249931 A | 9/2003 |
| JP | 2006-253739 A | 9/2006 |
| JP | 2008-293194 A | 12/2008 |
| JP | 2010-000663 A | 1/2010 |
| JP | 2010-277131 A | 12/2010 |
| JP | 2012-156697 A | 8/2012 |
| JP | 2012-217086 A | 11/2012 |

OTHER PUBLICATIONS

"Tour—Advanced Scripting: Write print scripts to control routing, redirection and print workflow—PaperCut", May 7, 2013 (May 7, 2013), XP055208766, Retrieved from the Internet: URL: https://web.archive.org/web/20130507101650/http://www.papercut.com/tour/advanced-scripting/ [retrieved on Aug. 20, 2015], pp. 1, 4, 7.
"Tour—Watermarking and Job Annotation—PaperCut", May 7, 2013 (May 7, 2013), XP055208808, Retrieved from the Internet: URL: https:// web.archive.org/web/20130507112716/http://www.papercut.com/tour/watermark/ [retrieved on Aug. 20, 2015], pp. 1-2.
Office Action dated Jun. 1, 2017, in Chinese Patent Application No. 201510109165.7.

\* cited by examiner

F I G. 6

| ATTRIBUTE ID | TYPE ID | VALUE | MEANING |
|---|---|---|---|
| 10 | 1 | ARBITRARY CHARACTER STRING | JOB NAME |
| 11 | 1 | ARBITRARY CHARACTER STRING | USER NAME |
| 100 | 2 | 1,2,3,4,5 OR AUTOMATIC | SHEET FEED STAGE |
| 101 | 2 | 1,2,3,4,5 | SHEET DISCHARGE STAGE |
| 104 | 2 | ON OR OFF | COPY NUMBER PRINTING |
| ... | ... | ... | ... |
| 401 | 2 | PORTRAIT, LANDSCAPE | CHARACTER ORIENTATION |
| 402 | 2 | UPPER LEFT, UPPER RIGHT, LOWER LEFT, LOWER RIGHT | PRINT LOCATION |
| 403 | 2 | YELLOW, MAGENTA, CYAN, BLACK | PRINT COLOR |
| 404 | 2 | 12 POINTS, 24 POINTS, 36 POINTS | PRINT SIZE |
| 405 | 11 | 1~9999 | PRINT START PAGE |

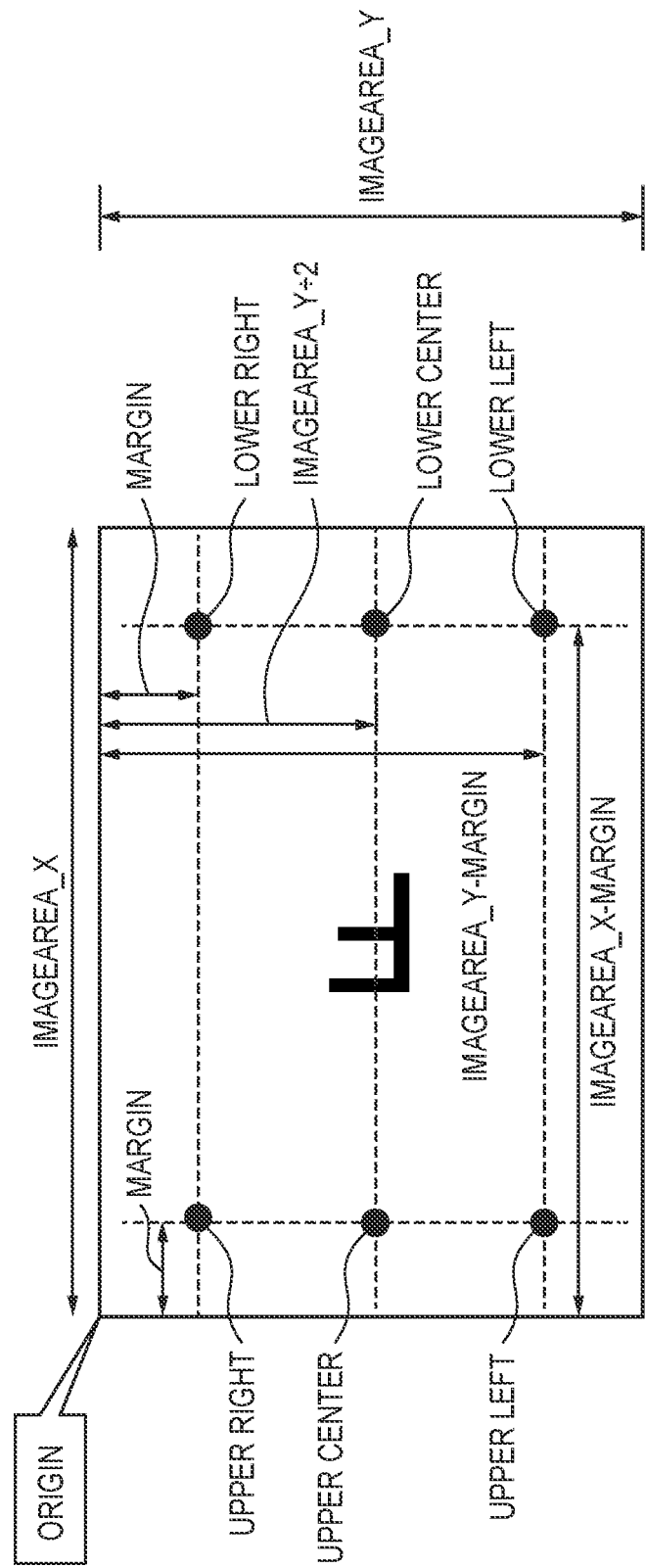

F I G. 13

<DESIGNATION OF USER CAPABLE OF CANCELING FORCED COPY NUMBER PRINTING SETTING>

DESIGNATE USER CAPABLE OF CANCELING FORCED COPY NUMBER PRINTING SETTING

| USER  | CANCELATION ABILITY |
|-------|---------------------|
| Admin | CAN                 |
| Taro  | CAN                 |
| Jiro  | CANNOT              |
| Hana  | CANNOT              |

CLOSE

FIG. 16A

<FORCED COPY NUMBER PRINTING>
SET FORCED COPY NUMBER PRINTING TO ON/OFF, SET TARGET JOB,
AND CHARACTER ORIENTATION AND PRINT LOCATION FOR PRINTING COPY NUMBER

LOCATION AND ORIENTATION

- CHARACTER ORIENTATION: PORTRAIT
- CHARACTER ORIENTATION: LANDSCAPE
- ON
- OFF
- COPY
- BOX
- PRINT

SCRAMBLE ~ 1601

CANCEL SETTINGS          OK

FIG. 16B

<USER ID SCRAMBLE SETTINGS>
SCRAMBLE USER ID IN ACCORDANCE WITH SETTINGS

2011/06/13  15:30 ~ 1603

| MONTH | DAY | TIME |
| 1604 | 1605 | 1606 |

F I G. 17A

| FORCED COPY NUMBER PRINTING | COPY | BOX | PRINT | LOCATION | CHARACTER ORIENTATION |
|---|---|---|---|---|---|
| ON | ON | ON | ON | LOWER RIGHT | LANDSCAPE |

F I G. 17B

| USER ID | PERMISSION |
|---|---|
| Admin | ON |
| Taro | ON |
| Jiro | OFF |
| Hana | OFF |

F I G. 17C

| TIME | 1:00 | 2:00 | 3:00 | 4:00 | 5:00 | 6:00 | 7:00 | 8:00 | 9:00 | 10:00 | 11:00 | 12:00 |
|---|---|---|---|---|---|---|---|---|---|---|---|---|
| SHIFT NUMBER | 1 | 2 | 3 | 4 | 5 | 6 | 7 | 8 | 9 | 10 | 11 | 12 |

| TIME | 13:00 | 14:00 | 15:00 | 16:00 | 17:00 | 18:00 | 19:00 | 20:00 | 21:00 | 22:00 | 23:00 | 24:00 |
|---|---|---|---|---|---|---|---|---|---|---|---|---|
| SHIFT NUMBER | 1 | 2 | 3 | 4 | 5 | 6 | 7 | 8 | 9 | 10 | 11 | 12 |

F I G. 17D

| | | | | | | | | | |
|---|---|---|---|---|---|---|---|---|---|
| | | | | | v | w | x | y | z |
| | | | | | 0x76 | 0x77 | 0x78 | 0x79 | 0x7a |
| l | m | n | o | p | q | r | s | t | u |
| 0x6c | 0x6d | 0x6e | 0x6f | 0x70 | 0x71 | 0x72 | 0x73 | 0x74 | 0x75 |
| b | c | d | e | f | g | h | i | j | k |
| 0x62 | 0x63 | 0x64 | 0x65 | 0x66 | 0x67 | 0x68 | 0x69 | 0x6a | 0x6b |
| X | Y | Z | [ | ¥ | ] | ~ | _ | ` | a |
| 0x58 | 0x59 | 0x5a | 0x5b | 0x5c | 0x5d | 0x5e | 0x5f | 0x60 | 0x61 |
| N | O | P | Q | R | S | T | U | V | W |
| 0x4e | 0x4f | 0x50 | 0x51 | 0x52 | 0x53 | 0x54 | 0x55 | 0x56 | 0x57 |
| D | E | F | G | H | I | J | K | L | M |
| 0x44 | 0x45 | 0x46 | 0x47 | 0x48 | 0x49 | 0x4a | 0x4b | 0x4c | 0x4d |
| : | ; | < | = | > | ? | @ | A | B | C |
| 0x3a | 0x3b | 0x3c | 0x3d | 0x3e | 0x3f | 0x40 | 0x41 | 0x42 | 0x43 |
| 0 | 1 | 2 | 3 | 4 | 5 | 6 | 7 | 8 | 9 |
| 0x30 | 0x31 | 0x32 | 0x33 | 0x34 | 0x35 | 0x36 | 0x37 | 0x38 | 0x39 |

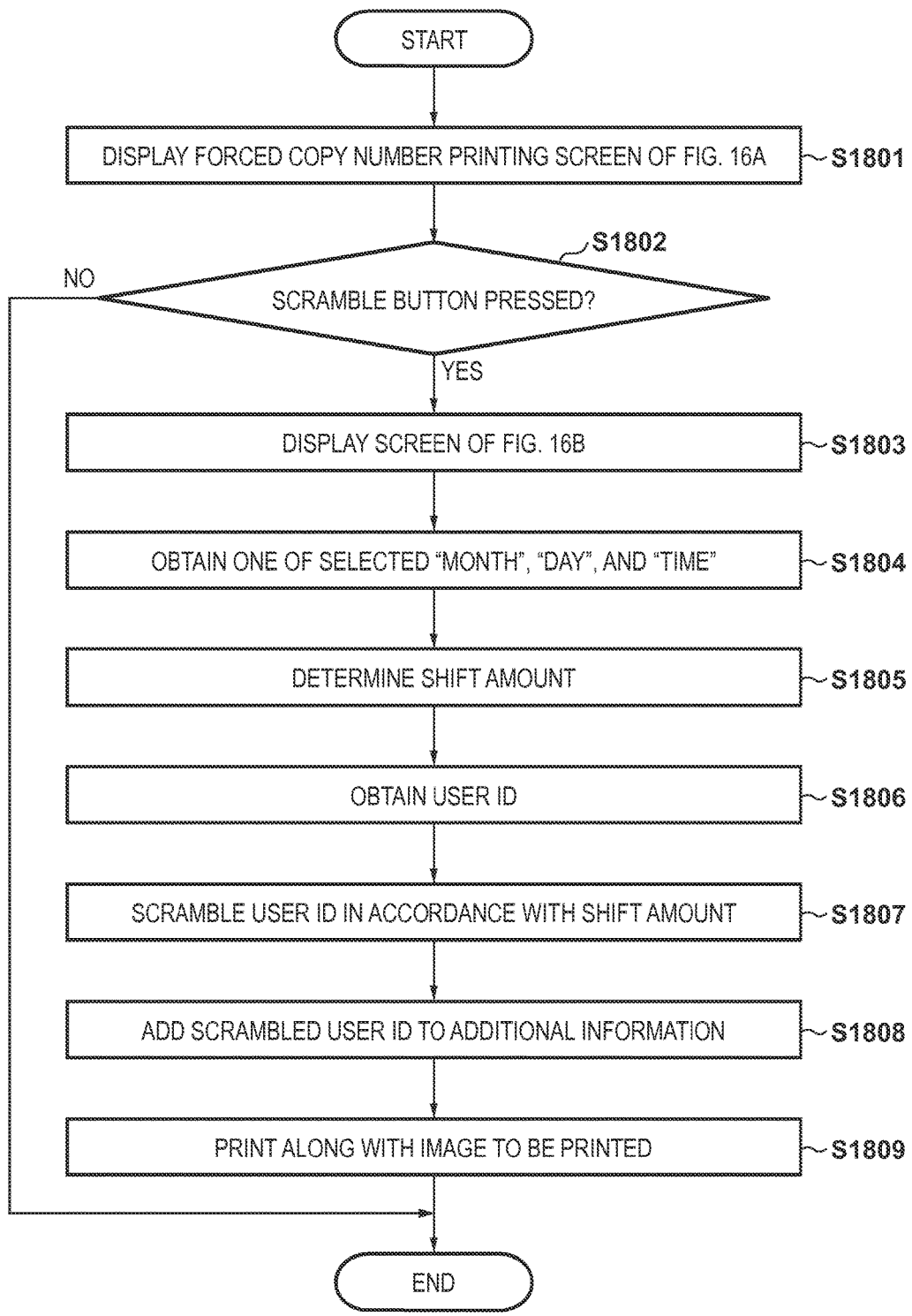

METHOD OF CONTROLLING A PRINTING APPARATUS THAT SCRAMBLES IDENTIFICATION INFORMATION OF AN AUTHENTICATED USER AND CAUSES A PRINTER TO PRINT CHARACTERS OBTAINED BY SCRAMBLING THE IDENTIFICATION INFORMATION, AND RELATED PRINTING METHOD, AND NON-TRANSITORY COMPUTER READABLE MEDIUM

BACKGROUND OF THE INVENTION

Field of the Invention

The present invention relates to an image forming apparatus, a method for controlling the same, and a computer-readable storage medium.

Description of the Related Art

There are functions in which at the time of printing by copying or when PDL image data is received and is to be printed, additional information that is related to a user ID used for log-in, dates on which image processing was performed, the user, and the user's operations is attached to an image that is to be printed and the image is printed. Also, there is known to be a technique in which the additional information is registered in a print server in advance so that additional information is always attached and printed without setting additional information for each job (refer to Japanese Patent Laid-Open No. 2012-217086). Also, there is known to be a function in which predetermined additional images are forcibly added and printed in order to manage sheets on which printing has been performed.

However, as described above, there are issues in that if predetermined information is always added and then printed, additional information is also printed on printed matter that is not required to be confidential, which limits the use of the printed matter.

Also, if log-in information such as a user ID is printed, personal information on the user is always printed on printed matter, and so the printed matter cannot be provided to a third party in this case.

SUMMARY OF THE INVENTION

The present invention provides a technique of performing setting such that additional information is not printed with an apparatus that is capable of adding additional information and forming an image.

In order to achieve the above described purpose, an image forming apparatus according to one aspect of the present invention includes the following configuration.

Specifically, an image forming apparatus includes: an adding unit configured to add additional information to an image; an output unit configured to output the image to which the additional information is added by the adding unit; a designating unit configured to designate a user; a determination unit configured to determine whether a user of the image forming apparatus is the user designated by the designating unit; and a control unit configured to permit to set not to add the additional information in a case where the determination unit determines that the user of the image forming apparatus is the user designated by the designating unit.

According to the present invention, even in a state where settings have been performed such that additional information is printed along with an image, it is possible to cancel printing of the additional information.

Also, when additional information is set to be printed, because personal information included in the additional information is printed while scrambled, it is possible to prevent personal information from being seen as-is by a third party.

Further features of the present invention will become apparent from the following description of exemplary embodiments (with reference to the attached drawings).

BRIEF DESCRIPTION OF THE DRAWINGS

The accompanying drawings are included in the specification, constitute portions thereof, indicate embodiments of the present invention, and are used to describe the principles of the present invention along with the description of the embodiments.

FIG. 6 is a diagram illustrating one example of attributes according to an embodiment.

FIGS. 9A to 9D are diagrams illustrating operations of reading a document and generating image data of the document.

FIG. 10 is a diagram showing an example of a log-in screen that is displayed on the operation unit of the MFP according to Embodiment 1 for a user to log in.

FIG. 13 is a diagram showing one example of a screen for designating a user who is able to cancel a setting of forced copy number printing, the screen being displayed on an operation unit of the MFP according to Embodiment 1.

FIG. 16A is a diagram showing an example of a forced copy number printing setting screen according to Embodiment 3.

FIG. 16B is a diagram showing one example of a scramble setting screen according to Embodiment 3.

FIG. 17A is a diagram showing one example of setting information when a forced copy number printing mode is set.

FIG. 17B is a diagram showing authority set by a user.

FIG. 17C is a diagram showing an example of setting the shift amount corresponding to time information.

FIG. 17D is a diagram showing an ASCII code table.

FIG. 18 is a flowchart illustrating processing in which a user ID is encrypted and printed when forced copy number printing is set in an MFP according to Embodiment 3.

DESCRIPTION OF THE EMBODIMENTS

Hereinafter, embodiments of the present invention will be described in detail with reference to the accompanying drawings. It is to be understood that the following embodiment is not intended to limit the scope of the claims of the present invention, and that not all of the combinations of the features that are described according to the following embodiment are necessarily required with respect to the means to solve the problems of the present invention.

Figure 1:
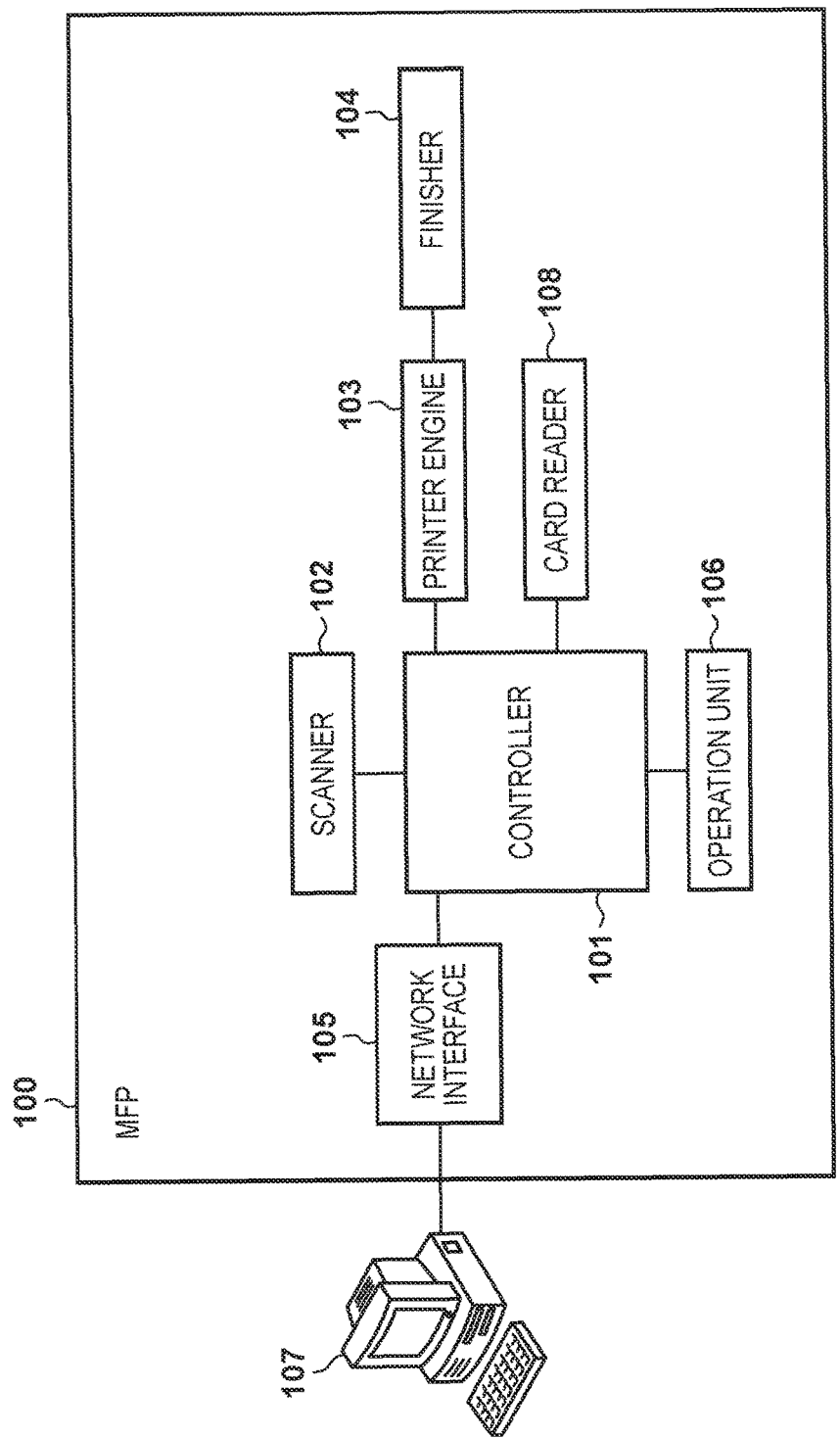
FIG. 1 is a block diagram showing the configuration of a printing system including a multi-function peripheral that is one example of an image forming apparatus according to an embodiment.

FIG. 1 is a block diagram showing the configuration of a print system including a multi-function peripheral (MFP: Multi-Function Peripheral) 100 that is one example of an image forming apparatus according to Embodiment 1.

Figure 2:
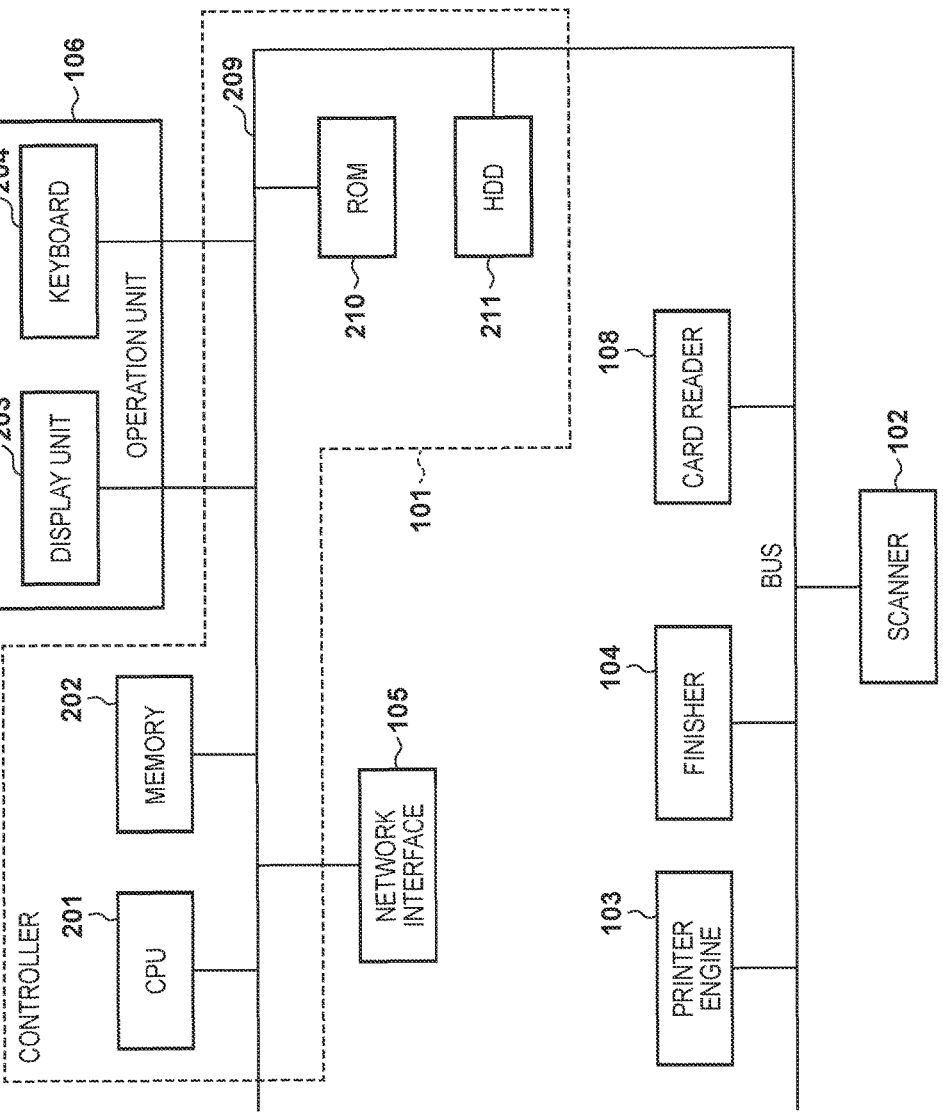
FIG. 2 is a block diagram illustrating the configuration of a controller according to an embodiment and a connection between the controller and the units described in FIG. 1.

A controller 101 controls operations of the MFP 100, and has a hardware configuration shown in FIG. 2. A scanner 102 is controlled by the controller 101, and reads an image of a document and generates image data thereof. A printer engine 103 is an electrophotographic printer engine, and prints an image on a sheet under the control of the controller 101. The printer engine 103 is connected to a finisher 104, and performs post-processing such as stapling, hole-punching, or the like on printed sheets, using the finisher 104. The finisher 104 is also controlled by the controller 101. A network interface 105 connects the MFP 100 to a network, and allows communication with a PC 107 on the network. An operation unit 106 has a display device such as a display unit that has a touch panel function, a hard key, an LED and the like, receives an operation performed by a user and sends the information to the controller 101, and displays images, messages and the like that are sent from the controller 101. A card reader 108 is an apparatus that reads information stored in a dedicated card for example when the card is inserted, and for example, is used for user authentication.

FIG. 2 is a block diagram illustrating the configuration of the controller 101 according to an embodiment, and connection between the controller 101 and units described in FIG. 1. It should be noted that although the operation unit 106, the card reader 108 and the like are shown in FIG. 2 as being connected in series to a bus 209 in order to simplify the description, actually, an interface unit exists between the bus 209 and the units. It should be noted that portions in common with FIG. 1 are shown with the same reference numerals, and description thereof is omitted.

In the controller 101, a CPU 201 is connected to a memory 202, a ROM 210, and an HDD (hard disk drive) 211 via the bus 209. The memory 202 has a DRAM, an SRAM and the like, and provides a region in which programs executed by the CPU 201 are expanded and a work area in which various data is temporarily stored when the CPU 201 executes control processing. The ROM 210 stores a boot program, apparatus information and the like. When the power of the MFP 100 is turned on, the CPU 201 executes programs stored in the ROM 210, reads out an OS and programs that are installed in the HDD 211, and expands the OS or programs in the memory 202. Accordingly, the MFP 100 is able to operate. The HDD 211 may be detachable from the MFP 100, or may be incorporated in the MFP 100. Moreover, a configuration is possible in which a program is downloaded from another MFP via a network and stored in the HDD 211.

The operation unit 106 has a display unit 203 including a touch panel function, and a keyboard 204 that is a hard key. When the CPU 201 receives data that is input by a user with the keyboard 204, the data is stored in the memory 202 and used in processing. Also, the CPU 201 is capable of outputting and displaying screen data, messages and the like that are stored in the memory 202 on the display unit 203.

Figure 3:
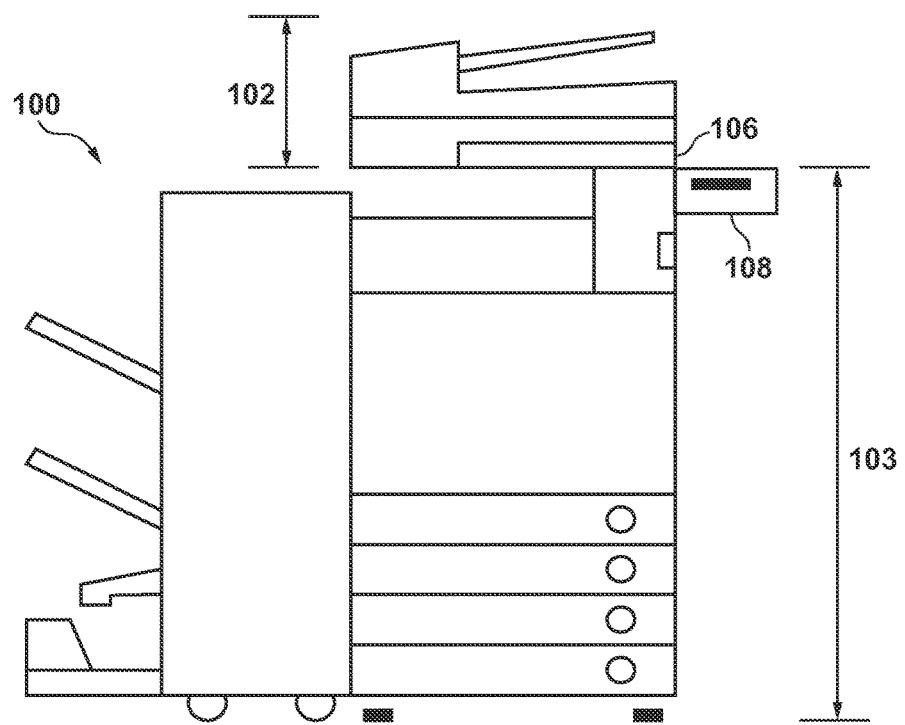
FIG. 3 is an overview diagram of an MFP according to an embodiment.

FIG. 3 is an overview diagram of the MFP 100 according to an embodiment. Portions shared with FIG. 1 described above are shown with the same reference numerals.

The scanner 102 irradiates a document with light and reads the reflected light by guiding a CCD line sensor (not shown), and thereby an image of the document is converted into image data. The controller 101 performs color determination, size determination and the like of the document from the image data. The printer engine 103 prints an image on a sheet based on the image data, performs post-processing such as stapling, hole-punching, or the like on the sheet using the finisher 104 as needed, and then outputs the image. An instruction given by the CPU 201 of the controller 101 starts or stops the printer engine 103 and the finisher 104. When a dedicated card is, for example, inserted, the card reader 108 reads information recorded on the card.

Figure 4:
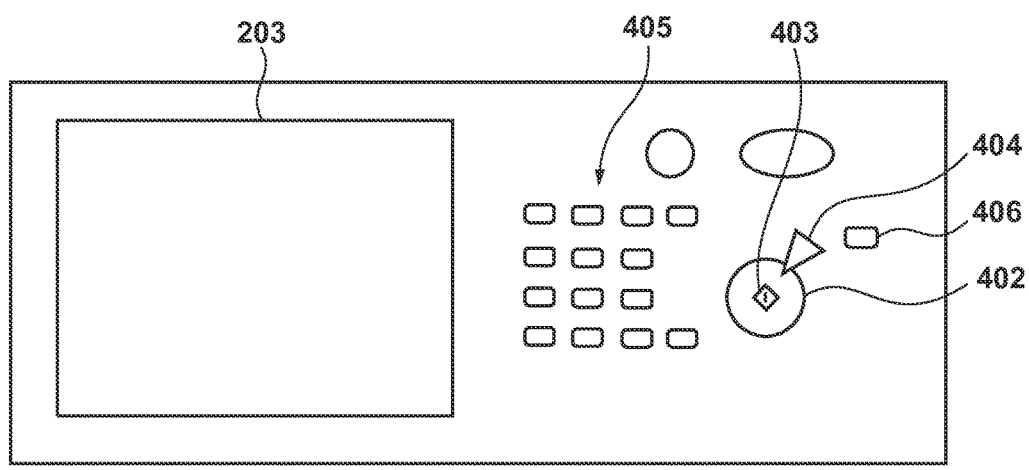
FIG. 4 is a top view of an operation unit of an MFP according to an embodiment.

FIG. 4 is a top view of the operation unit 106 of the MFP according to an embodiment.

A display unit 203, which is formed by attachment of a touch panel sheet onto a liquid crystal, displays an operation screen and soft keys, and when a displayed key is pressed, the display unit 203 sends position information of the pressed key to the CPU 201. A start key 402 is used in the case where an instruction is given to start reading a document. Green and red LEDs 403 are provided in the central portion of the start key 402, and in the case where the LED 403 is green, an instruction can be given so as to start an operation with the start key 402. A stop key 404 performs a function of stopping operations during running. A numeric keypad 405 is constituted by a button group of digits and characters, and is used to give instructions to set the number of copies, input a telephone number, switch screens of the display unit 203, and the like. A user mode key 406 is pressed in the case where a device is to be set. These hard keys correspond to the keyboard 204 in FIG. 2.

Figure 5:
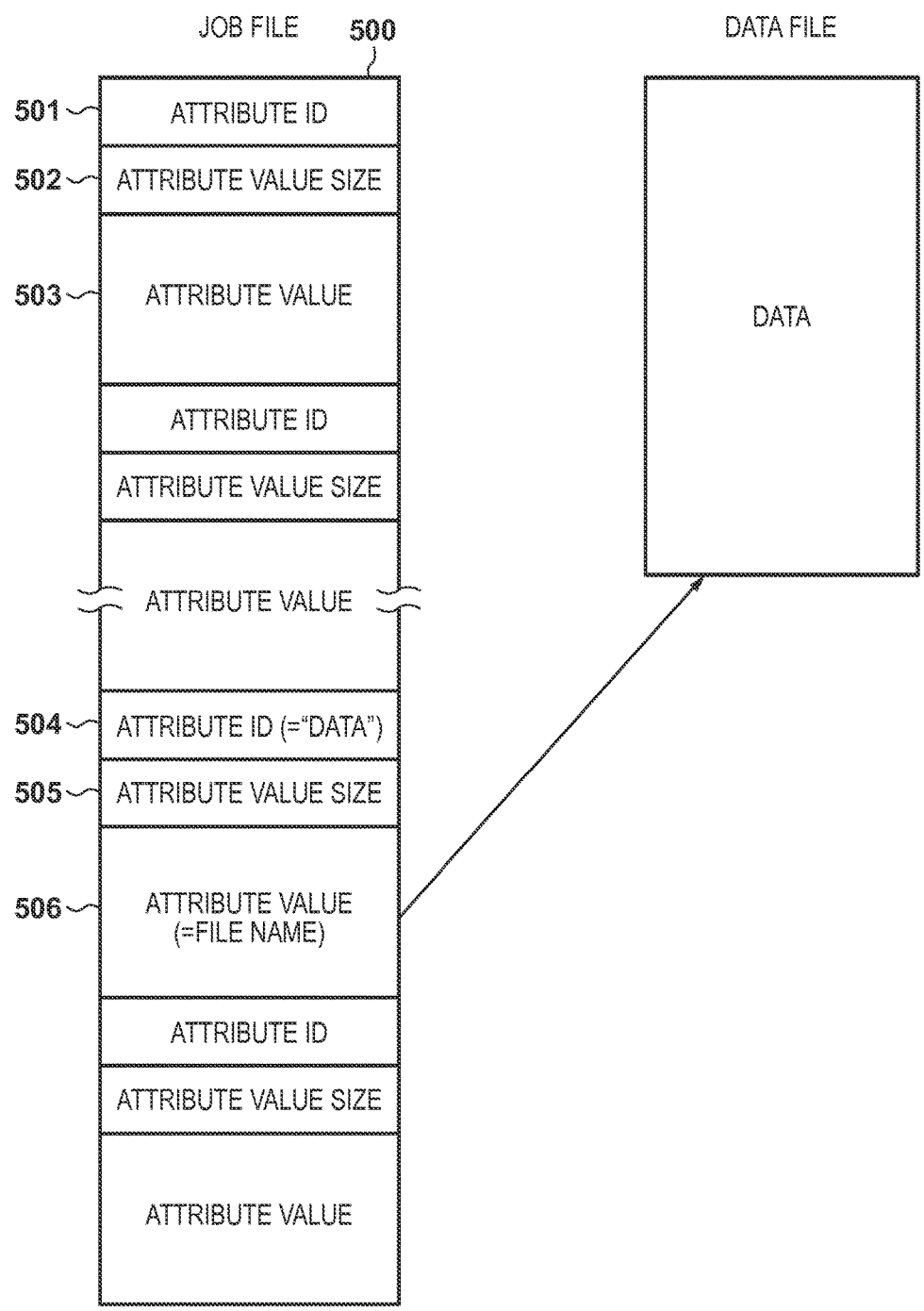
FIG. 5 is a diagram illustrating the configuration of job data according to an embodiment.

FIG. 5 is a diagram illustrating the configuration of job data according to an embodiment. The data is generated by programs executed by the CPU 201 as a result of receiving an instruction to execute a job from the operation unit 106 or the network interface 105.

In a copy job, a copy program is notified of settings input from the operation unit 106, and the data is generated based on the notified information. In a PDL job, a PDL application is generated based on information received via the network interface 105.

A job file 500, which is the entity of a job, is constituted by multiple combinations of attribute IDs 501, attribute value sizes 502 and attribute values 503. In the case where a job file includes data, the attribute ID 504 is "data", and a size of the data file is registered in the attribute value size 505 and a file name of the data file is registered in the attribute value 506. Also, a format (a PDL that is used and the like) of data, the number of copies, a cassette stage, a sheet size used in printing, designation of finish processing and the like are included as attributes.

FIG. 6 is a diagram illustrating one example of attributes according to an embodiment.

Attribute ID 601 indicates ID numbers of attributes. Type ID 602 represents types (sizes) of IDs, and "1" indicates an undefined length and "2" indicates one byte. Value 603 indicates values that can be used for attributes, and meaning 604 indicates the meanings of the attributes. Attributes shown in FIG. 6 are merely examples, and various attributes may exist other than these attributes.

It should be noted that in FIG. 6, attribute IDs "401" to "405" indicate attributes of character strings that indicate the copy number when copy number printing is designated.

Embodiment 1

Hereinafter, Embodiment 1 will be described in which the digits indicating the copy number are printed as additional information. In Embodiment 1, for example, description will be given taking, as an example, an image forming apparatus that is capable of setting copy number printing (an additional information print mode), in which when a document is copied, additional information (the copy number) is attached to an image (an image that is to be subjected to image formation) of the document and image formation (printing) is performed. It should be noted that the additional information is not limited to being the copy number, and for example, may be user information, information unique to the printed matter and the like.

Figure 7A:
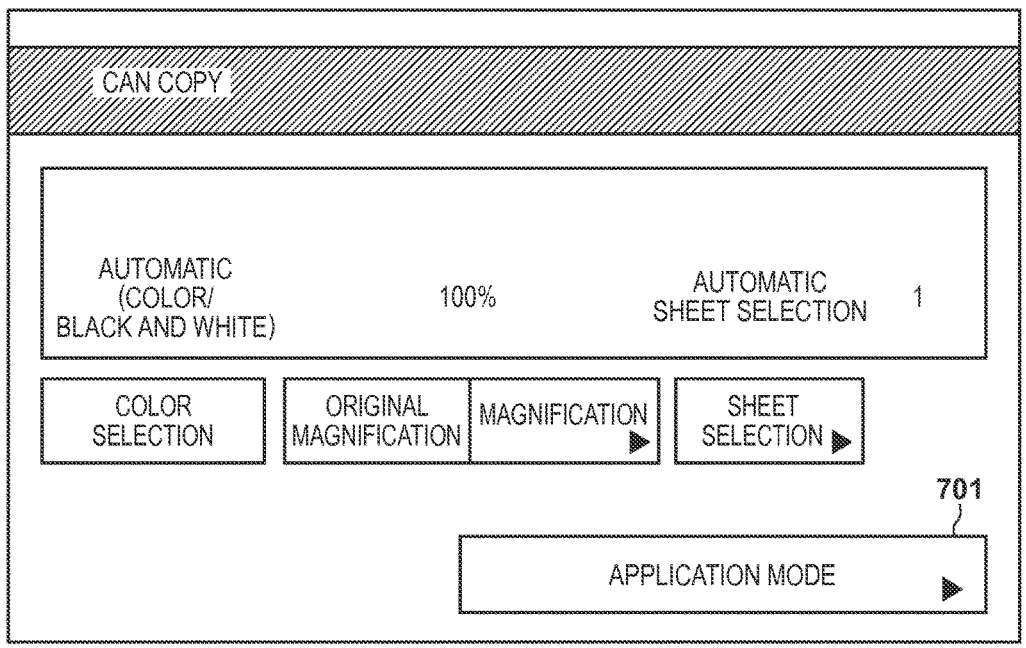
FIG. 7A is a diagram showing a copy initial screen that is displayed on an operation unit of an MFP according to Embodiment 1.

FIG. 7A is a diagram showing one example of a copy initial screen displayed on an operation unit 106 of an MFP 100 according to Embodiment 1.

A user can select the magnification or sheet via the screen. Also, various functions can be set by pressing an application mode button 701.

Figure 7B:
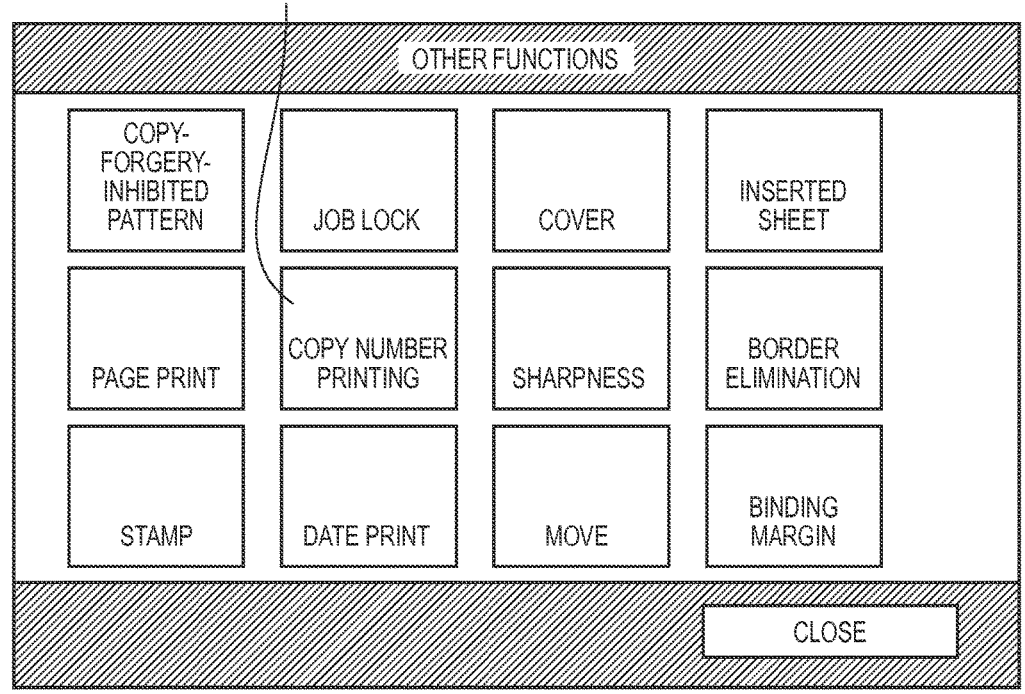
FIG. 7B is a diagram showing an example of a screen when an application mode button according to Embodiment 1 is pressed.

FIG. 7B is a diagram showing an example of a screen displayed when the application mode button 701 is pressed in FIG. 7A.

Detailed settings for functions such as "copy number printing", "cover", "inserted sheet" and the like can be performed on the screen of FIG. 7B.

Figure 8:
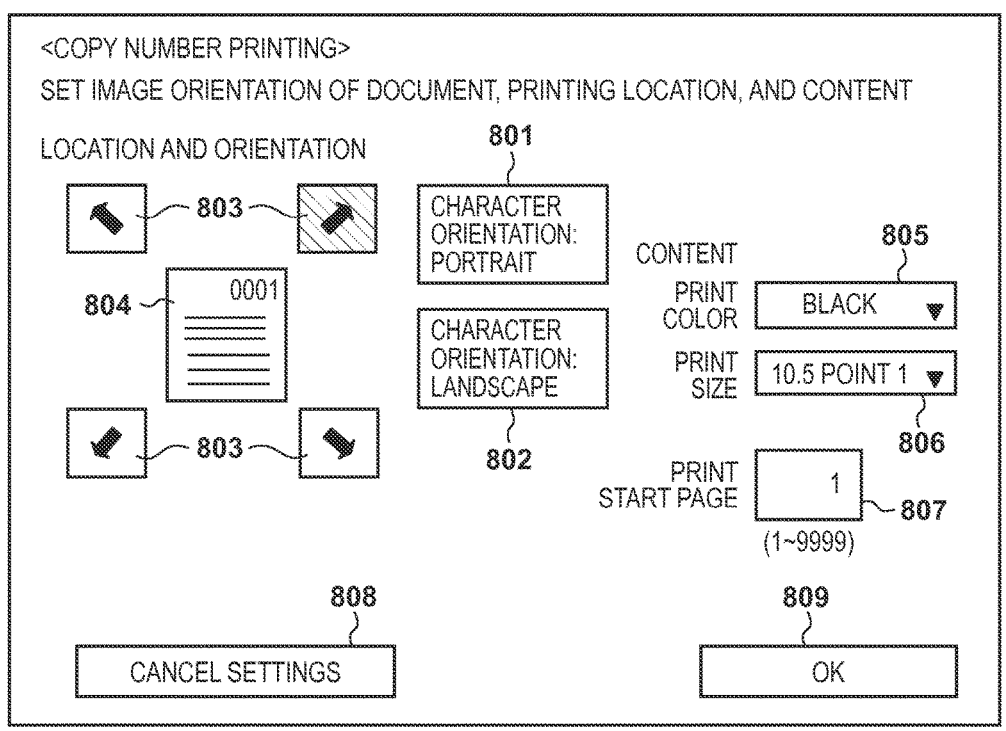
FIG. 8 is a diagram showing an example of a screen that is displayed when "copy number printing" is pressed on the screen of FIG. 7B.

FIG. 8 is a diagram showing an example of a screen displayed when "copy number printing" 702 is pressed on the screen of FIG. 7B. The "copy number printing" is a function in which a digit string that indicates the copy number to which a page belongs is printed at a location designated in the page that is to be printed in a job (for example, copy) to be executed.

It is possible to set, using the screen, the orientation of characters indicating the copy number, a location (lower right, upper right and the like) on a page at which characters indicating the copy number are to be printed, a color and size of characters indicating the copy number, print start digits indicating which page copy number printing starts, and the like.

A "character orientation: portrait" button 801 and a "character orientation: landscape" button 802 are buttons for setting the character orientation of the character string indicating the copy number, by which either a portrait orientation or a landscape orientation can be set. A "print location setting" button 803 is a button for setting a location at which the character string indicating the copy number is to be printed, and by which "upper left", "upper right", "lower left", "lower right" of a sheet can be set in accordance with the orientation of an arrow. In FIG. 8, "upper right" is selected, and a print image 804 displays an image of a sheet on which a digit string indicating the copy number is printed in the upper right portion of a page in accordance with the settings. A "print color" button 805 is a button for setting a color for the digits indicating the copy number, and although "black" is displayed in FIG. 8, a list of other colors is displayed each time the print color button 805 is pressed, and a user can select a desired color. A "print size" button 806 is a button for designating a size of digits indicating the copy number, and although "10.5 points" is displayed in FIG. 8, other point numbers are displayed each time the print size button 806 is pressed, and a user can select a desired size. A "print start page" input area 807 is an area where a start number (a page) of the pages on which the copy number is to be printed is designated, and the digits can be input using the numeric keypad 405. A user presses an OK button 809 when activating the setting of copy number printing set on the screen. On the other hand, a user presses a "setting cancel" button 808 in the case of canceling the setting of copy number printing set on the screen.

When copy number printing is set via the screen of FIG. 8, a value 603 whose attribute ID in the attributes in FIG. 6 is "104" is "ON", and contents set on the screen of FIG. 8 are set in attribute IDs "401" to "405". A job file shown in FIG. 5 is generated in this manner, and the job can be executed.

FIGS. 9A to 9D are diagrams illustrating operations of reading a document and generating image data of the document in Embodiment 1.

As described above, a copy application is started when copy number printing is set using the operation unit 106 and the start key 402 of the operation unit 106 is pressed, and a job file in a state in which a value 603 is "ON" in the attribute ID "104" of FIG. 6 is generated.

Figure 9A:
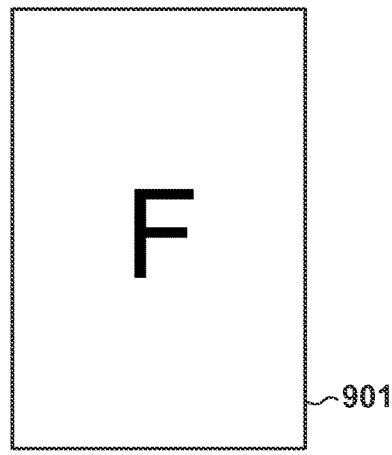
Figure 9B:
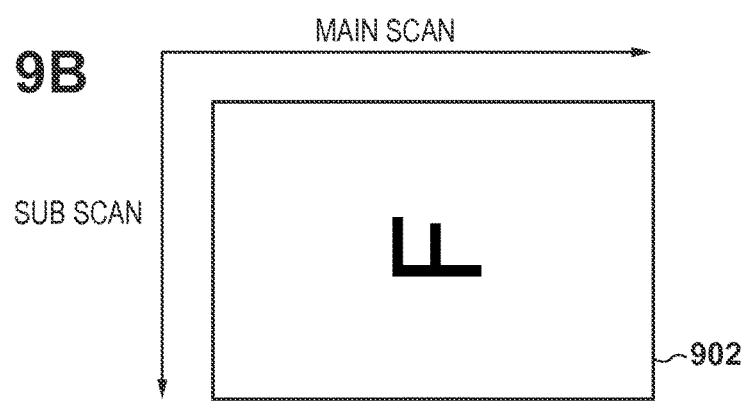

When a copy job is executed, a document 901 shown in FIG. 9A is read by a scanner 102, and electronic data 902 of the document 901 shown in FIG. 9B is expanded in a memory 202.

FIG. 9D is a diagram showing a state in which copy number printing has been set and a location at which digits indicating the copy number are printed has been determined.

If a value of an attribute ID "402" specified using a print location setting button 803 of FIG. 8 is "upper right" as in FIG. 8, the location of a memory indicated by "upper right" in FIG. 9D is calculated, and if it is "upper left", the location of a memory indicated by "upper left" in FIG. 9D is calculated, a character string indicating the copy number is respectively disposed at these locations. Here, as shown in FIG. 9D, even if "upper right" is designated, a character string is not disposed at the upper right end of the image, and the character string is disposed on the inside by a preset margin. Therefore, the coordinates of the location indicated by "upper right" in FIG. 9D are "MARGIN, MARGIN". Such margin data is stored in either a memory 202 of a controller 101 or an HDD 211. Also, in the case where "upper left" is designated, the location is indicated by "upper left" in FIG. 9D, and the coordinates thereof are "MARGIN, IMAGEAREA_Y-MARGIN". Also, the coordinates of other locations such as "lower right", "upper center", "lower center" and the like can be similarly determined.

Figure 9C:
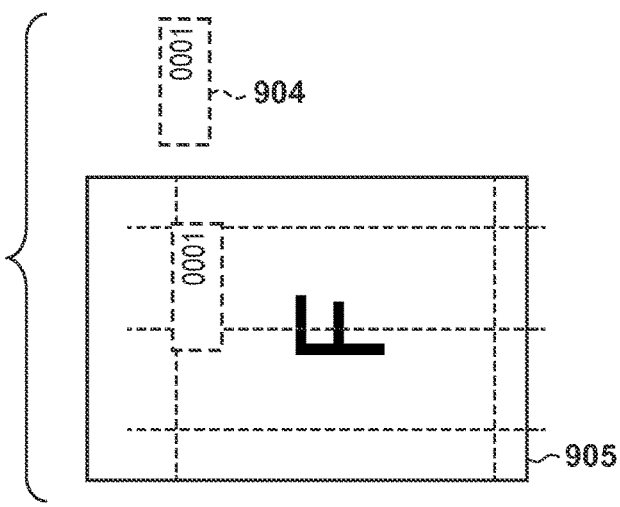

When the printing location of the digits indicating the copy number is determined in this manner, the digits indicating the copy number are expanded in the memory 202 as indicated by reference numeral 904 of FIG. 9C. Thereafter, an image 904 of the digits and an image 901 that was read by a scanner 102 are combined, and image data indicated by reference numeral 905 is generated and printed by a printer engine 103. Printed matter of a document image to which additional information has been attached can be obtained.

Figure 10:
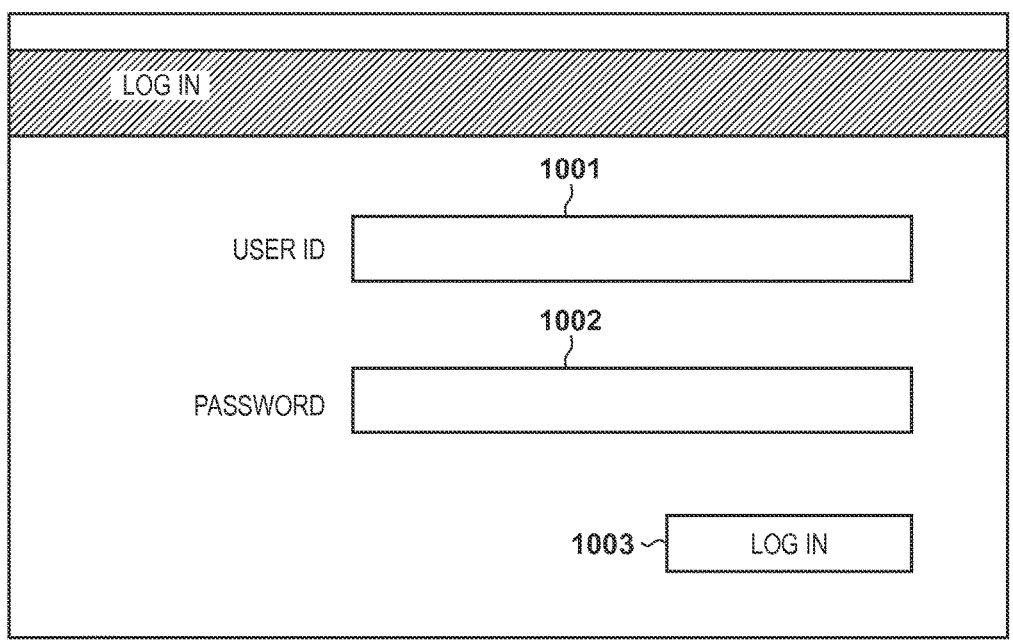

FIG. 10 is a diagram showing an example of a log-in screen for a user to log in, which is displayed on the operation unit 106 of the MFP 100 according to Embodiment 1.

A user ID input box 1001, a password input box 1002 and a log-in button 1003 for a user to input a user ID and a password are displayed on the log-in screen. When a user ID and a password that are input on the screen match user information registered in the memory 202 or the HDD 211, the user is authenticated and he or she can log into the MFP.

Figure 11A:
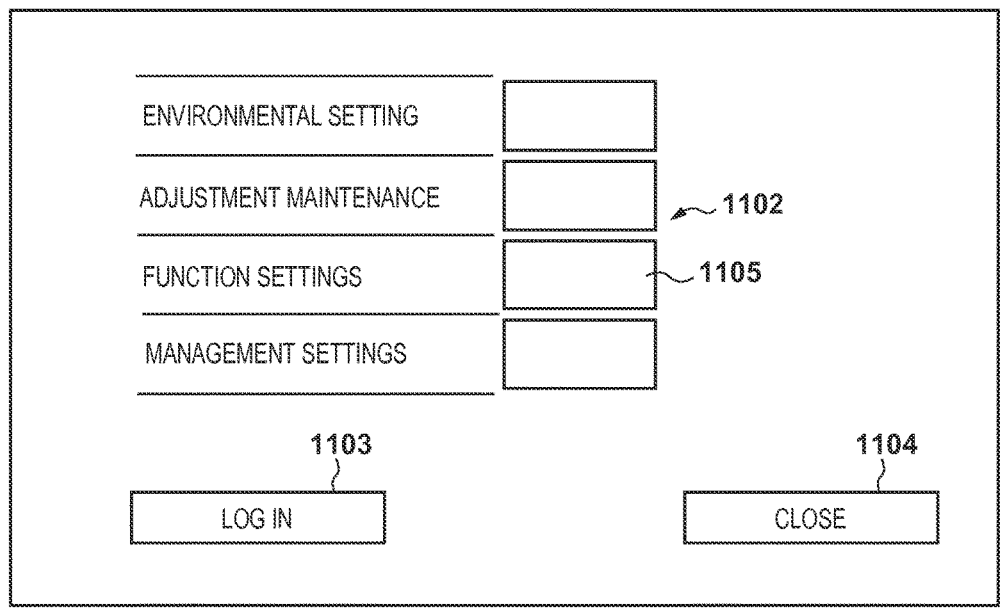
FIGS. 11A to 11B are diagrams illustrating an example in which forced copy number printing is set in the MFP according to Embodiment 1.
Figure 11B:
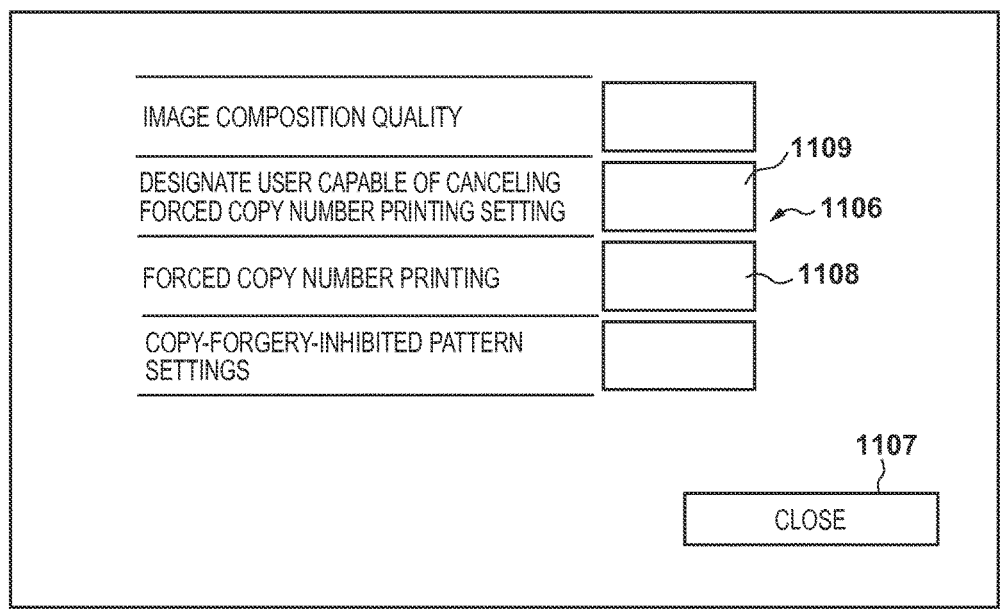

FIGS. 11A to 11B are diagrams illustrating an example in which forced copy number printing is set in the MFP 100 according to Embodiment 1.

FIG. 11A shows an example of an initial screen in a user mode displayed on the display unit 203 when the user mode key 406 of the operation unit 106 is pressed. A user presses any of the buttons in a button group 1102, and thereby can perform corresponding settings. The log-in button 1103 is pressed when authority as an administrator is required. A close button 1104 is pressed when a user ends settings of a user mode.

A screen in FIG. 11B shows an example of a screen displayed when a function setting button 1105 of the button group 1102 is pressed in FIG. 11A. When a button in a button group 1106 is selected, a user can perform settings corresponding to the items. A user presses a close button 1107 when he or she wants to close the screen. Accordingly, the screen returns to the screen of FIG. 11A.

Figure 12A:
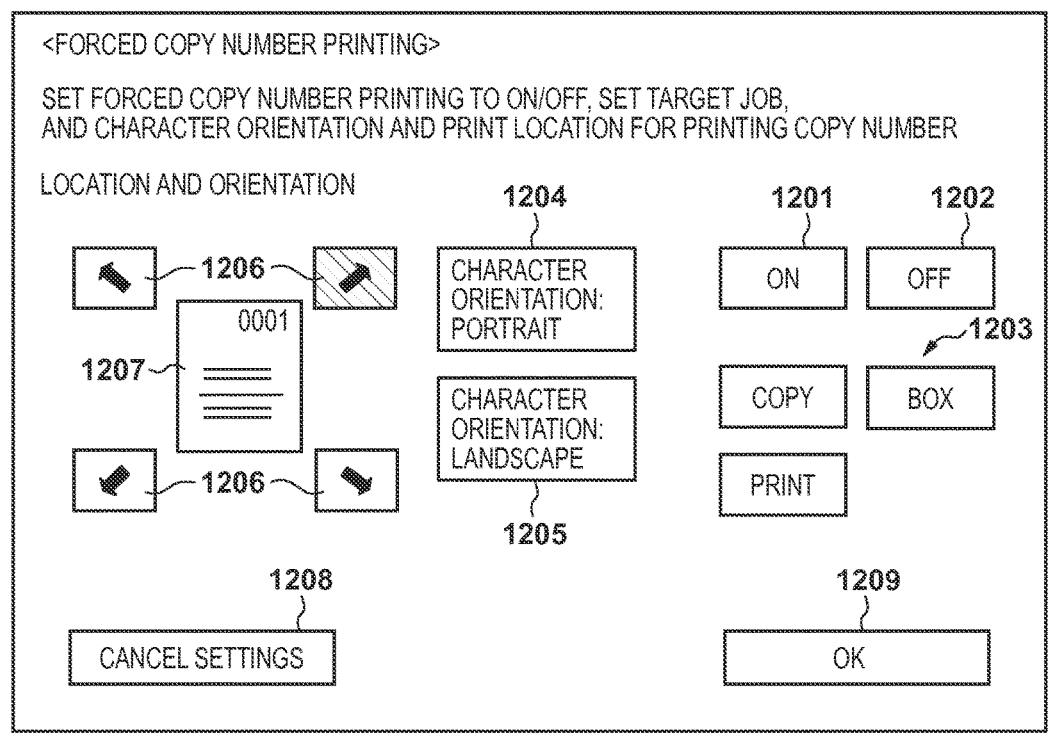
FIG. 12A is a diagram showing an example of a forced copy number printing setting screen according to Embodiment 1.

When a "forced copy number printing" button 1108 is pressed in FIG. 11B, a screen shown in FIG. 12A is displayed on the display unit 203. Unlike the above-described setting of copy number printing, which is set for each job, with the forced copy number printing, settings are performed such that the copy number is forcibly printed in the same manner for a plurality of jobs. Also, a "designate user capable of canceling forced copy number printing setting" button 1109 is a button for designating a user who can cancel the setting of forced copy number printing or a user who cannot cancel the setting, and when the button 1109 is pressed, the screen transitions to the screen in FIG. 13.

FIG. 12A is a diagram showing an example of a forced copy number printing setting screen.

Figure 12B:
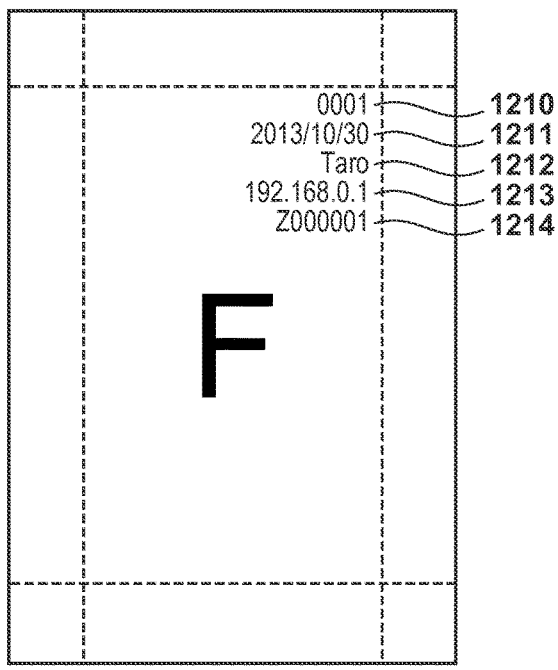
FIG. 12B is a diagram showing a result of printing.

When an "ON" button 1201 is pressed on the screen, forced copy number printing is activated. When forced copy number printing is set to ON, even if settings performed via the screen of FIG. 8 described above are not set for each job, the copy number for the job designated on the screen of FIG. 12A is forcibly printed. As shown in FIG. 12B, a user ID, a serial number, dates and an IP address are also printed along with the copy number at the same time. An "OFF" button 1202 is pressed when the setting of forced copy number printing is to be canceled. In FIG. 12B, additional information including the copy number is printed in the upper right portion of a page in accordance with the settings of FIG. 12A.

A job type button group 1203 includes buttons for specifying a job in which forced copy number printing is to be performed, and it is possible to select one or a plurality of "Copy", "Box" and "Print". "Copy" is processing in which a document is read and printed, and "Box" is a job in which a document and the like stored in a box of the HDD 211 are printed. "Print" is a job in which printing is performed based on a print job received from a PC 107 and the like described above. It is possible to perform settings such that forced copy number printing is performed in a job corresponding to a button specified here. A "character orientation: portrait" button 1204 and a "character orientation: landscape" button 1205 are buttons for setting character string orientation indicating the copy number that is added in forced copy number printing, and either portrait or landscape orientation is selected to set the character string orientation. Similarly to the case of FIG. 8, a "print location setting" button 1206 is a button for setting a location at which a character string indicating the copy number is to be printed, and "upper left", "upper right", "lower left" and "lower right" can be set in accordance with the orientation of each arrow. In FIG. 12A, "upper right" is selected, and an image 1207 in which characters indicating the copy number are printed in the upper right is displayed.

In the case where settings of the screen are to be canceled, a "setting cancel" button 1208 is pressed to exit the screen. Also, when setting on the screen is finished, an "OK" button 1209 is pressed.

FIG. 12B is a diagram showing results of printing in the case where settings of the screen of FIG. 12A are activated by selecting "Copy" in the job type button group 1203 and login is performed using a user ID "Taro".

In FIG. 12B, reference numeral 1210 indicates digits indicating the copy number, reference numeral 1211 indicates the date, reference numeral 1212 indicates a user ID, reference numeral 1213 indicates an IP address, and reference numeral 1214 indicates a serial number.

These pieces of information are stored in the memory 202 or the HDD 211 of the controller 101.

FIG. 17A is a diagram showing one example of setting information when a forced copy number printing mode is set.

In FIG. 17A, forced copy number printing is set to ON in any of Copy, Box, and Print, the printing location is the lower right of a page, and the character string orientation is set to a landscape orientation.

FIG. 13 is a diagram showing one example of a screen for designating a user who can cancel the setting of forced copy number printing, displayed on the operation unit 106 of the MFP 100, according to Embodiment 1.

When a "designate user capable of canceling forced copy number printing setting" button 1109 in a button group 1106 shown in FIG. 11B is pressed, the screen shown in FIG. 13 is displayed. It should be noted that the button 1109 can be pressed by only a user who has administrator authority. A list of user IDs described above is displayed in user 1301, and information indicating whether or not each user can cancel the setting of forced copy number printing is displayed in a canceling (cancelation) ability 1302. The canceling ability 1302 is configured by a button, and display of "can cancel" and "cannot cancel" is switched each time the button is pressed. When a close button 1303 is pressed, the information set on the screen is stored in the memory 202 or the HDD 211 of the controller 101 in a data format such as that shown in FIG. 17B, for example.

In FIG. 17B, only the users whose user IDs are "Admin" and "Taro" are registered as users who can cancel the setting of the forced copy number printing in accordance with settings of the screen shown in FIG. 13.

Figure 14:
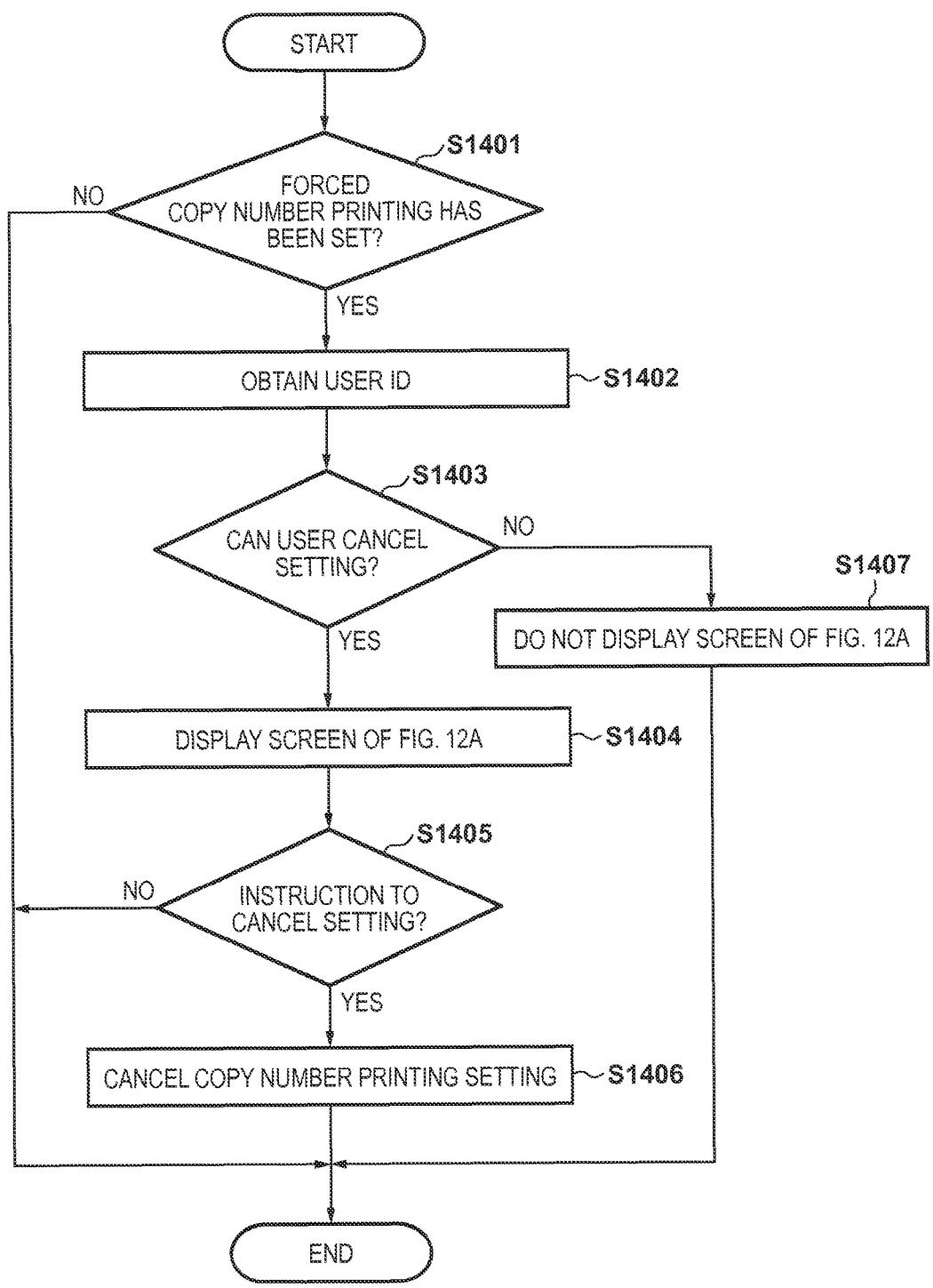
FIG. 14 is a flowchart illustrating processing in which the setting of forced copy number printing is canceled in the MFP according to Embodiment 1.

FIG. 14 is a flowchart illustrating processing for canceling the setting of forced copy number printing in the MFP 100 according to Embodiment 1. The processing indicated by the flowchart is realized by the CPU 201 executing programs expanded in the memory 202 from the HDD 211.

The processing indicated by the flowchart is started by the "forced copy number printing" button 1108 of the screen in FIG. 11B being pressed. First, the CPU 201 determines in step S1401 whether or not forced copy number printing is set to be ON. The CPU 201 performs the determination with reference to data such as that shown in FIG. 17A above because the data is stored in the HDD 211, for example. In the case of OFF here, or in other words, when forced copy number printing has not been set, the screen of FIG. 12A is displayed, and the CPU 201 ends the processing.

On the other hand, when the CPU 201 determines in step S1401 that forced copy number printing has been set, the processing moves to step S1402, and the CPU 201 obtains the ID of the user who is logged into the MFP 100. Next, the processing moves to step S1403, the CPU 201 determines, with reference to data in FIG. 17B, whether or not the user ID belongs to a user who is permitted to cancel the setting of forced copy number printing. Here, if the user ID belongs to a user who is not permitted to cancel the setting of mandatory copy number printing, the processing moves to step S1407, and the CPU 201 ends the processing without displaying the screen shown in FIG. 12A.

On the other hand, if the CPU 201 determines in step S1403 that the user ID belongs to a user who is permitted to cancel the setting of forced copy number printing, the processing moves to step S1404, the CPU 201 displays the screen shown in FIG. 12A, and the processing moves to step S1405. In step S1405, the CPU 201 determines whether an "OFF" button 1202 has been selected and an "OK" button 1209 has been pressed. If the "OK" button is pressed, the processing moves to step S1406, and the CPU 201 cancels the setting of forced copy number printing (FIG. 17A) stored in the memory 202 or the HDD 211, and the processing ends. On the other hand, if a "setting cancel" button 1208 is pressed or the "OFF" button 1202 is not selected in step S1405 even if the "OK" button 1209 has been pressed, the processing ends.

As described above, according to Embodiment 1, user authority can be changed and a user who has the authority can cancel the setting of forced copy number printing. Accordingly, for example, an administrator temporarily gives this authority to a given user, and the user can perform settings such that copy number printing is prohibited for a specific job executed by the user, and the user can execute the job.

Also, because the authority for canceling forced copy number printing can be given to each user, in the case where forced copy number printing is set by an administrator, a user can perform printing without copy number printing as long as he or she has the authority.

Accordingly, an effect is obtained by which it is possible to solve problems such that additional information is printed on printed matter that is not required to be confidential because predetermined information is always added and printed and thus use of the printed matter is limited.

Embodiment 2

Next, Embodiment 2 will be described. Embodiment 2 describes a case in which a card is used by which the setting of forced copy number printing can be canceled, and thereby anyone can cancel the setting of forced copy number printing if he or she uses the card. It should be noted that because the hardware configuration and the like of an MFP 100 according to Embodiment 2 are the same as Embodiment 1 described above, description thereof is omitted.

Figure 15:
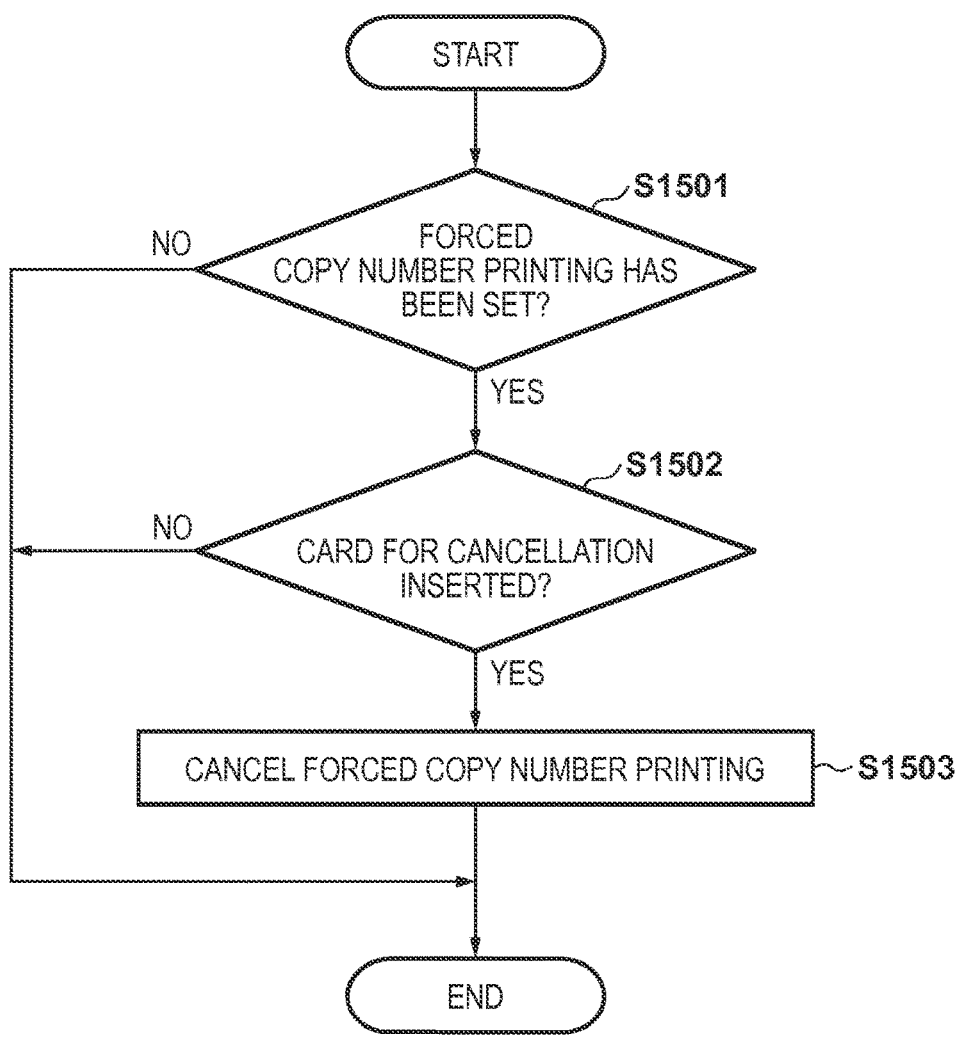
FIG. 15 is a flowchart illustrating processing in which the setting of forced copy number printing is canceled in an MFP according to Embodiment 2.

FIG. 15 is a flowchart illustrating processing in which the setting of forced copy number printing is canceled in the MFP according to Embodiment 2. The processing indicated by the flowchart is realized by the CPU 201 executing programs expanded in the memory 202 from the HDD 211.

First, the CPU 201 determines in step S1501 whether or not forced copy number printing has been set, similarly to step S1401 in FIG. 14. Here, if the setting of forced copy number printing has not been set, the processing ends. When the CPU 201 determines that forced copy number printing has been set, the processing moves to step S1502, and the CPU 201 determines whether or not a card for canceling the setting of forced copy number printing has been inserted in a card reader 108 (or otherwise read by the card reader 108). In the case where the card has not been inserted, the processing ends. When the CPU 201 determines in step S1502 that the card has been inserted, the processing moves to step S1503, and similarly to step S1406 in FIG. 14, the CPU 201 cancels the setting of forced copy number printing and the processing ends.

It should be noted that after step S1502, a screen such as that shown in FIG. 12A is displayed, and as in the flowchart of FIG. 14, the CPU 201 may determine whether or not the setting of forced copy number printing is canceled in accordance with setting information input via the screen.

As described above, according to Embodiment 2, a card for canceling the setting of forced copy number printing is used, and thereby any user can cancel the setting of forced copy number printing. Accordingly, more flexible operations can be achieved than the case where authority to cancel forced copy number printing is limited to a specific user.

Embodiment 3

Next, Embodiment 3 will be described. Embodiment 3 describes a case in which user information that is to be printed along with the copy number is encrypted (scrambled) so that the user information cannot be recognized by a third party. It should be noted that because the hardware configuration and the like of an MFP 100 according to Embodiment 3 are the same as Embodiment 1 described above, description thereof is omitted.

FIG. 16A is a diagram showing an example of a screen for setting forced copy number printing according to Embodiment 3.

The screen is displayed on a display unit 203 due to an instruction given from a controller CPU 201. The screen of FIG. 16A is obtained by adding a scramble button 1601 to the screen of FIG. 12A. When the scramble button 1601 is pressed, a screen shown in FIG. 16B is displayed.

FIG. 16B is a diagram showing an example of a screen where information that serves as a key used in scrambling can be selected.

Here, a key used for scrambling can be selected from a date that is forcibly printed in forced copy number printing. Here, any one of a month button 1604, a day button 1605, and a time button 1606 can be selected.

Next, a method for scrambling user information will be described.

Here, a later-described shift amount is determined based on the month 1604, the day 1605 and time 1606 selected on the screen of FIG. 16B and a date/time 1603.

When the month 1604 is selected here, "6" is the shift amount for the date/time 1603 "Jun. 13, 2011, 15:30". Also, when the day 1605 is selected, "13" is the shift amount for the date/time 1603 "Jun. 13, 2011, 15:30". Also, in the case where the time 1606 is selected, the shift amount is determined as follows.

FIG. 17C is a diagram showing a relationship between a value indicating the hour of the time and the shift amount.

It should be noted that a value indicating the minutes of the time is directly added to the shift amount corresponding to the time. Description will be given in detail. When the time 1606 is selected in FIG. 16B, with reference to FIG. 17C, shift amounts "3", which corresponds to 15:30, and "30", which corresponds to 30 minutes, are obtained from the date/time 1603 "Jun. 13, 2011 15:30", and a total of these shift amounts "33" serves as the shift amount.

Next, for example, the user ID is scrambled using the shift amount.

FIG. 17D is a diagram showing an ASCII code, and in the case where a user ID is "123456", character codes thereof are respectively shifted by the above described shift amount "33 (21H in hexadecimal code)". Accordingly, because the code for the character "1" is "0x31", a code "0x52" obtained by adding "0x21" thereto is the code resulting from conversion, which corresponds to "R" according to FIG. 17D. Hereinafter, the remaining characters "23456" is similarly converted, and the user ID "123456" is converted into "RSTUVW". It should be noted that in the case where an added value exceeds "0x7a" in FIG. 17C, the value returns to "0x30".

FIG. 18 is a flowchart illustrating processing for encrypting and printing a user ID when forced copy number printing is set in the MFP according to Embodiment 3. The processing indicated by the flowchart is realized by the CPU 201 executing programs expanded in the memory 202 from the HDD 211.

The processing is started in a state in which a forced copy number printing setting screen shown in FIG. 16A is displayed in step S1801. Next, in step S1802, the CPU 201 determines whether a scramble button 1602 of the screen is pressed. When the scramble button 1602 is not pressed, the processing ends. On the other hand, when the CPU 201 determines that the scramble button 1602 is pressed, the processing moves to step S1803 and the CPU 201 displays the screen shown in FIG. 16B. The CPU 201 then in step S1804 obtains any one of "month", "day", and "time" selected on the screen of FIG. 16B, and the CPU 201 determines the shift amount in accordance with the selected item in step S1805.

Next, the processing moves to step S1806, and the CPU 201 obtains the ID of a user who has logged using the screen of FIG. 10. Next, the processing moves to step S1807, and the CPU 201 scrambles the obtained user ID in accordance with the shift amount determined in step S1805. Thereafter, the processing moves to step S1808, and the CPU 201 prints, in step S1809, the scrambled user ID at a designated location of an image to be printed as a user ID of additional information (for example, additional information shown in FIG. 12) to be printed in forced copy number printing.

According to Embodiment 3, even if a forced copy number printing mode is set, there is no risk of presenting personal information to a third party as-is because user information is scrambled and printed even in the case where copy number printing is set.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-052434, filed Mar. 14, 2014, which is hereby incorporated by reference wherein in its entirety.

What is claimed is:

1. A method of controlling an image forming apparatus having a scanner that scans a document to obtain an image of the document as the image and a printer that prints an image on a sheet, the method comprising:
   performing an authentication processing for authenticating a user that uses the image forming apparatus;
   causing the scanner to scan a document in accordance with a copy instruction by the user authenticated as the user that uses the image forming apparatus;
   obtaining a month, day, and time on which the image obtained by scanning the document with the scanner is printed by the printer;
   scrambling identification information of the authenticated user using at least one of the obtained month, day, and time; and
   causing the printer to print, on a sheet, (i) the image obtained by scanning the document with the scanner, (ii) one or more characters obtained by scrambling the identification information, and (iii) the obtained month, day, and time.

2. The method according to claim 1, further comprising setting at least one of a location on the sheet, a color, a size, and an orientation of a set of the one or more characters obtained by scrambling the identification information and the obtained month, day, and time.

3. The method according to claim 1, further comprising adding the one or more characters obtained by scrambling the identification information and the obtained month, day, and time to the image to be printed, wherein, in the causing the printer to print, (i) the image, (ii) the one or more characters obtained by scrambling the identification information, and (iii) the obtained month, day, and time that have been added are printed.

4. An image forming apparatus comprising:
   (A) a scanner that scans a document to obtain an image of the document as the image;

(B) a printer that prints an image on a sheet; and
(C) one or more processors that execute a set of instructions;
  (a) to perform an authentication processing for authenticating a user that uses the image forming apparatus;
  (b) to cause the scanner to scan a document in accordance with a copy instruction by the user authenticated as the user that uses the image forming apparatus;
  (c) to obtain a month, day, and time on which the image obtained by scanning the document with the scanner is printed by the printer;
  (d) to scramble identification information of the authentication user using at least one of the obtained month, day, and time; and
  (e) to cause the printer to print on a sheet, (i) the image obtained by scanning the document with the scanner, (ii) one or more characters obtained by scrambling the identification information, and (iii) the obtained month, day, and time.

5. A non-transitory computer-readable storage medium that stores a program for causing a computer to execute a method of controlling an image forming apparatus having a scanner that scans a document to obtain an image of the document as the image and a printer that prints an image on a sheet, the method comprising:
  performing an authentication processing for authenticating a user that uses the image forming apparatus;
  causing the scanner to a scan a document in accordance with a copy instruction by the user authenticated as the user that uses the image forming apparatus;
  obtaining a month, day, and time on which the image obtained by scanning the document with the scanner is printed by the printer;
  scrambling identification information of the authenticated user using at least one of the obtained month, day, and time; and
  causing the printer to print on a sheet, (i) the image obtained by scanning the document with the scanner, (ii) one or more characters obtained by scrambling the identification information, and (iii) the obtained month, day, and time.

6. The method according to claim 1, wherein, in the scrambling, one or more character codes representing the identification information are shifted by a shift amount identified by at least one of the obtained month, day, and time, and
  wherein, in the causing the printer to print, the one or more characters corresponding to the shifted one or more character codes indicating the one or more characters that indicate the scrambled identification information are printed.

7. The method according to claim 6, wherein the shifting of the one or more character codes by the shift amount generates one or more other character codes.

8. The method according to claim 7, wherein the one or more other character codes are in ASCII code.

9. The method according to claim 1, wherein, in the causing the printer to print, (i) the image, (ii) the one or more characters obtained by scrambling the identification information, (iii) the obtained month, day, and time, and (iv) at least one of an IP address and a serial number, are printed on the sheet.

10. The method according to claim 1, further comprising:
  setting whether or not to print the identification information by scrambling the identification information; and
  switching, in accordance with a setting set in the setting, to print the one or more characters obtained by scrambling the identification information using at least one of the obtained month, day, and time, or to print the identification information without scrambling.

11. The method according to claim 1, further comprising a displaying screen for causing a user to select any of the obtained month, day, and time to be used for the scrambling of the identification information,
  wherein, in the scrambling, the identification information is scrambled using any of the obtained month, day and time selected via the screen.

\* \* \* \* \*